(12) United States Patent
Uchida et al.

(10) Patent No.: US 11,521,043 B2
(45) Date of Patent: Dec. 6, 2022

(54) INFORMATION PROCESSING APPARATUS FOR EMBEDDING WATERMARK INFORMATION, METHOD, AND COMPUTER READABLE STORAGE MEDIUM

(71) Applicant: KDDI CORPORATION, Tokyo (JP)

(72) Inventors: Yusuke Uchida, Fujimino (JP); Shigeyuki Sakazawa, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 792 days.

(21) Appl. No.: 16/424,840

(22) Filed: May 29, 2019

(65) Prior Publication Data

US 2019/0294955 A1 Sep. 26, 2019

Related U.S. Application Data

(63) Continuation of application No. PCT/JP2017/045656, filed on Dec. 20, 2017.

(30) Foreign Application Priority Data

Jan. 12, 2017 (JP) .............................. JP2017-003041

(51) Int. Cl.
*G06N 3/04* (2006.01)
*G06N 20/20* (2019.01)
(Continued)

(52) U.S. Cl.
CPC ........... *G06N 3/0454* (2013.01); *G06F 21/16* (2013.01); *G06N 3/08* (2013.01); *G06N 3/084* (2013.01);
(Continued)

(58) Field of Classification Search
CPC ........ G06N 3/0454; G06N 3/08; G06N 3/084; G06N 20/20; G06F 21/16; G06T 1/0021; G06T 2201/0065
See application file for complete search history.

(56) References Cited

U.S. PATENT DOCUMENTS 9,594,983 B2 3/2017 Alattar et al.
9,633,306 B2 4/2017 Liu et al.
(Continued)

FOREIGN PATENT DOCUMENTS

EP 0120975 A1 10/1984
JP S5966703 A 4/1984
(Continued)

OTHER PUBLICATIONS

Ha et al., HyperNetworks, Dec. 2016. (Year: 2016).*
(Continued)

*Primary Examiner* — Kamran Afshar
*Assistant Examiner* — Marshall L Werner
(74) *Attorney, Agent, or Firm* — Thomas | Horstemeyer, LLP

(57) ABSTRACT

An information processing method for embedding watermark bits into weights of a first neural network includes: obtaining an output of a second neural network by inputting a plurality of input values obtained from a plurality of weights of the first neural network to the second neural network; obtaining second gradients of the respective plurality of input values based on an error between the output of the second neural network and the watermark bits; and updating the weights based on values obtained by adding first gradients of the weights of the first neural network that have been obtained based on backpropagation and the respective second gradients.

7 Claims, 12 Drawing Sheets

(51) Int. Cl.
*G06N 3/08* (2006.01)
*G06T 1/00* (2006.01)
*G06F 21/16* (2013.01)

(52) U.S. Cl.
CPC ........... *G06N 20/20* (2019.01); *G06T 1/0021* (2013.01); *G06T 2201/0065* (2013.01)

(56) References Cited

U.S. PATENT DOCUMENTS

| | | | |
|---|---|---|---|
| 2015/0006444 | A1 | 1/2015 | Tamatsu et al. |
| 2015/0055855 | A1* | 2/2015 | Rodriguez ............ G06K 9/6259 382/155 |
| 2016/0328643 | A1 | 11/2016 | Liu et al. |
| 2017/0206449 | A1* | 7/2017 | Lain ..................... G06N 3/02 |
| 2017/0372201 | A1* | 12/2017 | Gupta ................. G06N 3/0454 |

FOREIGN PATENT DOCUMENTS

| | | |
|---|---|---|
| JP | 2013025356 A | 2/2013 |
| JP | 2014026389 A | 2/2014 |
| JP | 2015011510 A | 1/2015 |
| JP | 2015052832 A | 3/2015 |
| JP | 2015057630 A | 3/2015 |
| WO | 2016/043734 A1 | 3/2016 |
| WO | 2018131405 A1 | 7/2018 |

OTHER PUBLICATIONS

Gupta et al., U.S. Appl. No. 62/353,040 Specification—Provisional for US 2017/0372201 (Year: 2016).*
Extended European Search Report for European Patent Application No. 17891383.6 dated Jan. 9, 2020.
International Search Report for PCT/JP2017/045656 dated Mar. 13, 2018 (partially translated).
Krizhevsky et al., ImageNet Classification with Deep Convolutional Neural Networks, NIPS'12, pp. 1-9.
Simonyan et al., Very Deep Convolutional Networks for Large-Scale Image Recognition, ICLR'15, Apr. 10, 2015, pp. 1-14.
Ma et al., End-to-end Sequence Labeling via Bi-directional LSTM-CNNs-CRF, Proceedings of the 54th Annual Meeting of the Association for Computational Linguistics, ACL'16, Aug. 7-12, 2016, pp. 1064-1074, Berlin, Germany.
Ren et al., Faster R-CNN: Towards Real-Time Object Detection with Region Proposal Networks, Microsoft Research, NIPS'15, 1-9.
Liu et al., SSD: Single Shot MultiBox Detector, ECCV'16, Dec. 29, 2016, pp. 1-17.
Yu et al., Digital Watermarking based on Neural Networks for Color Images, Signal Processing vol. 81, No. 3, 2001, pp. 663-671.
El'Arbi et al., Video Watermarking Based on Neural Networks, IEEE, 2006, pp. 1577-1580.
Li et al., Lecture 7: Convolutional Neural Networks, Stanford University, Jan. 27, 2016, Internet URL:http://cs231n.stanford.edu/slides/winter1516_lecture7.pdf, retrieved Jan. 4, 2017, pp. 1-89.
Regularization, Wikipedia Japan, Internet URL:https://ja.wikipedia.org/wiki/%E6%AD%A3%E5%89%87%E5%8C%96, retrieved Jan. 4, 2017.
Krogh et al., A Simple Weight Decay Can Improve Generalization, Proc. of NIPS, 1992, pp. 950-957.

* cited by examiner

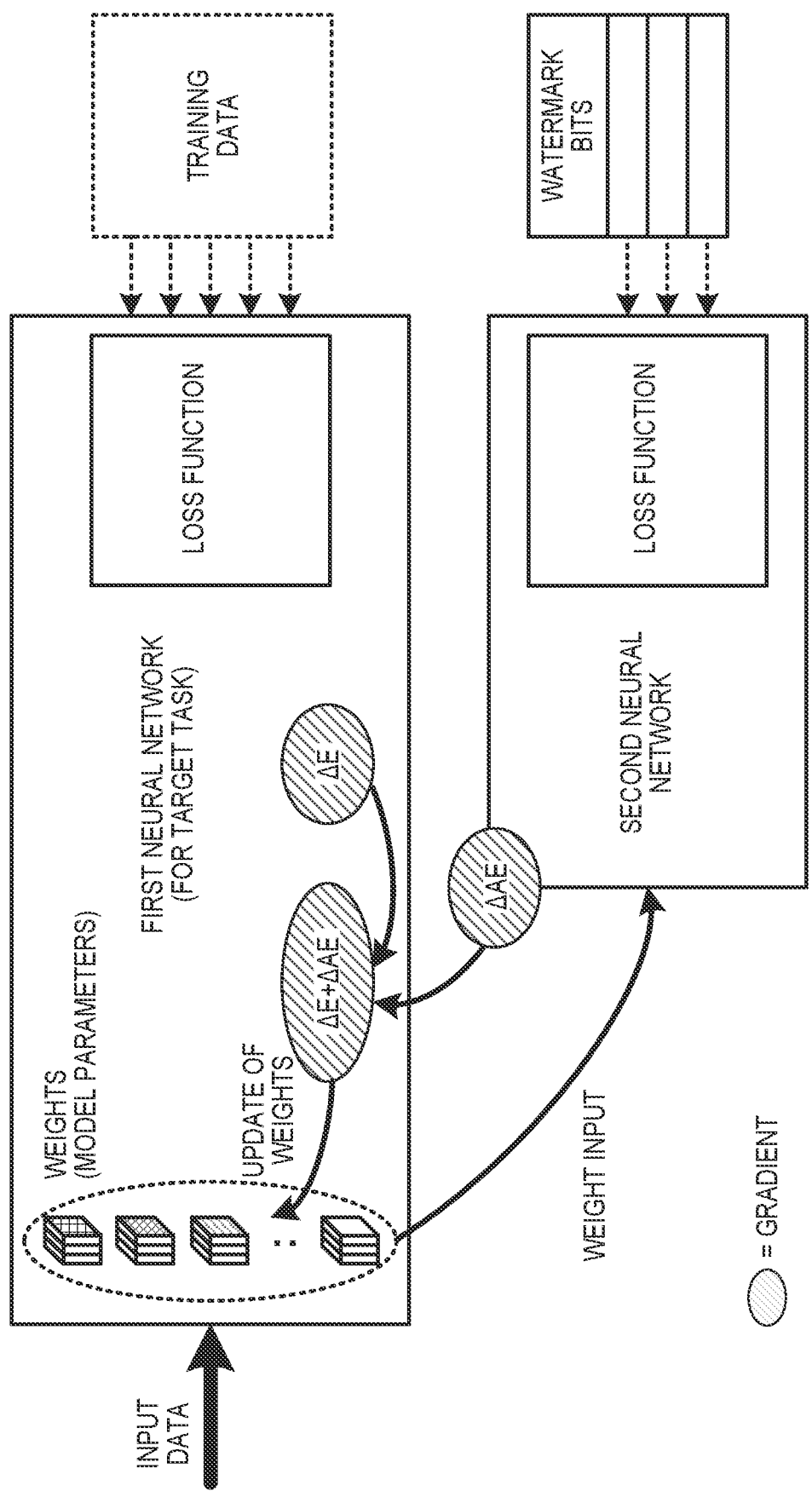
F I G. 5

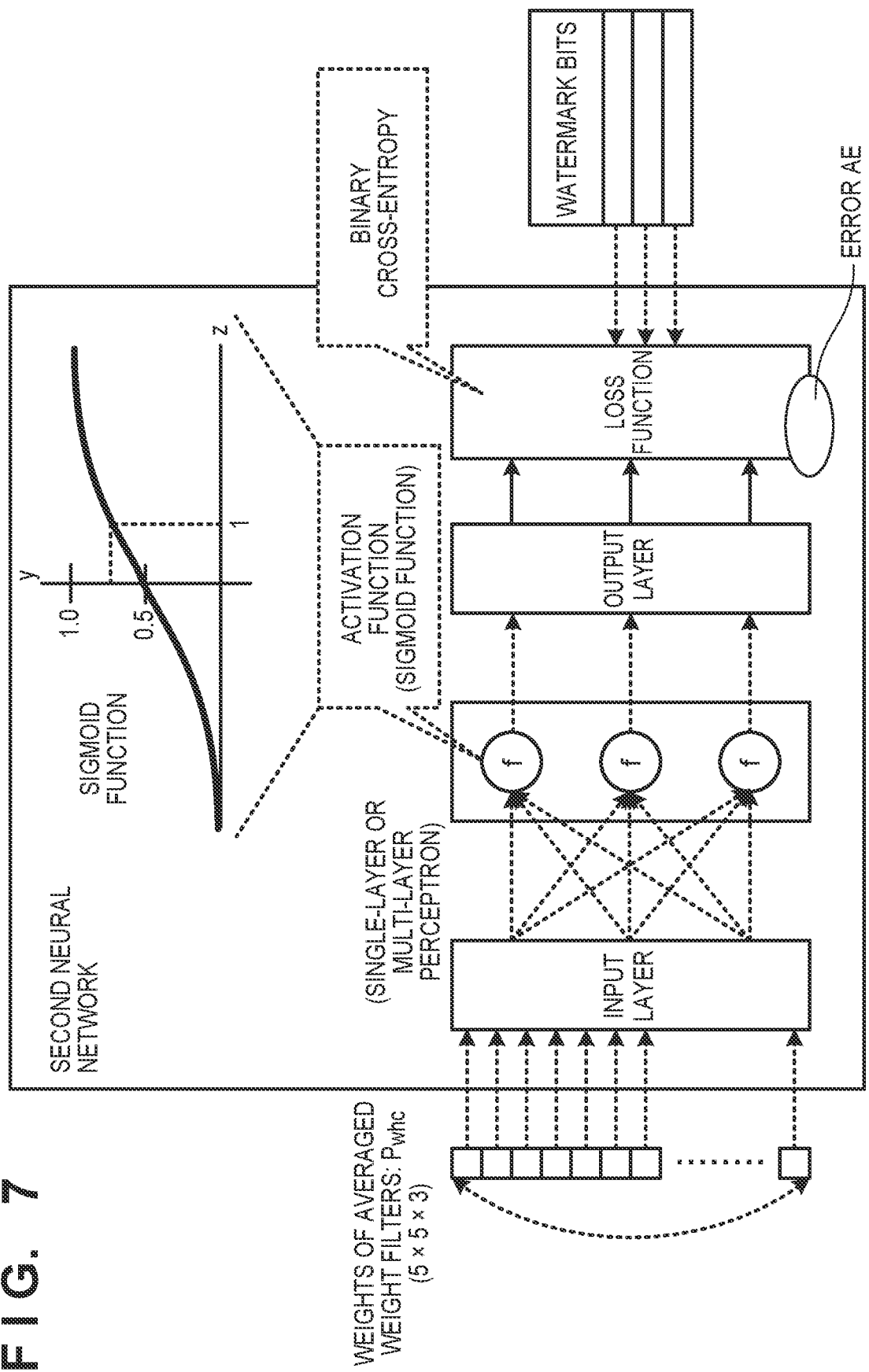

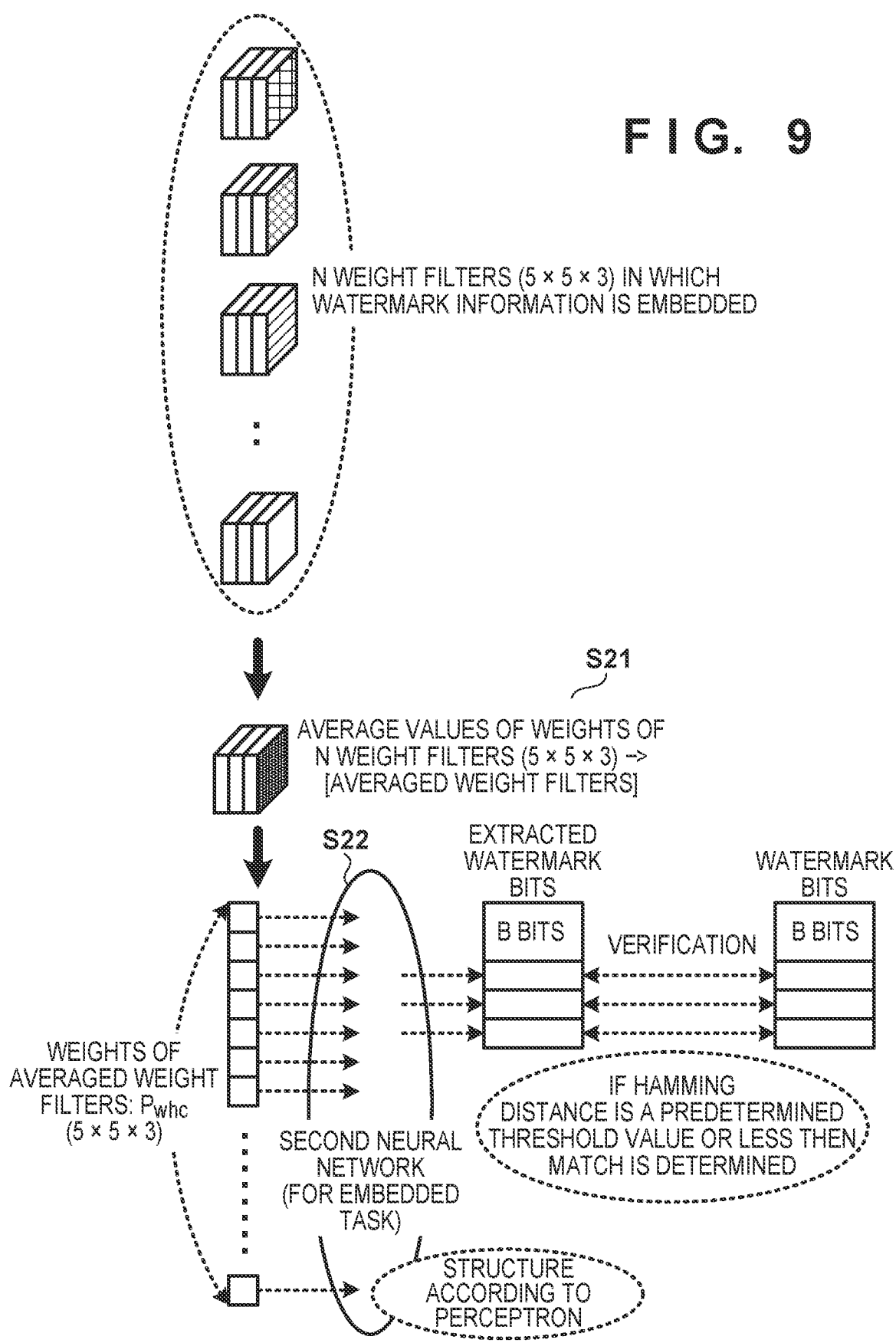

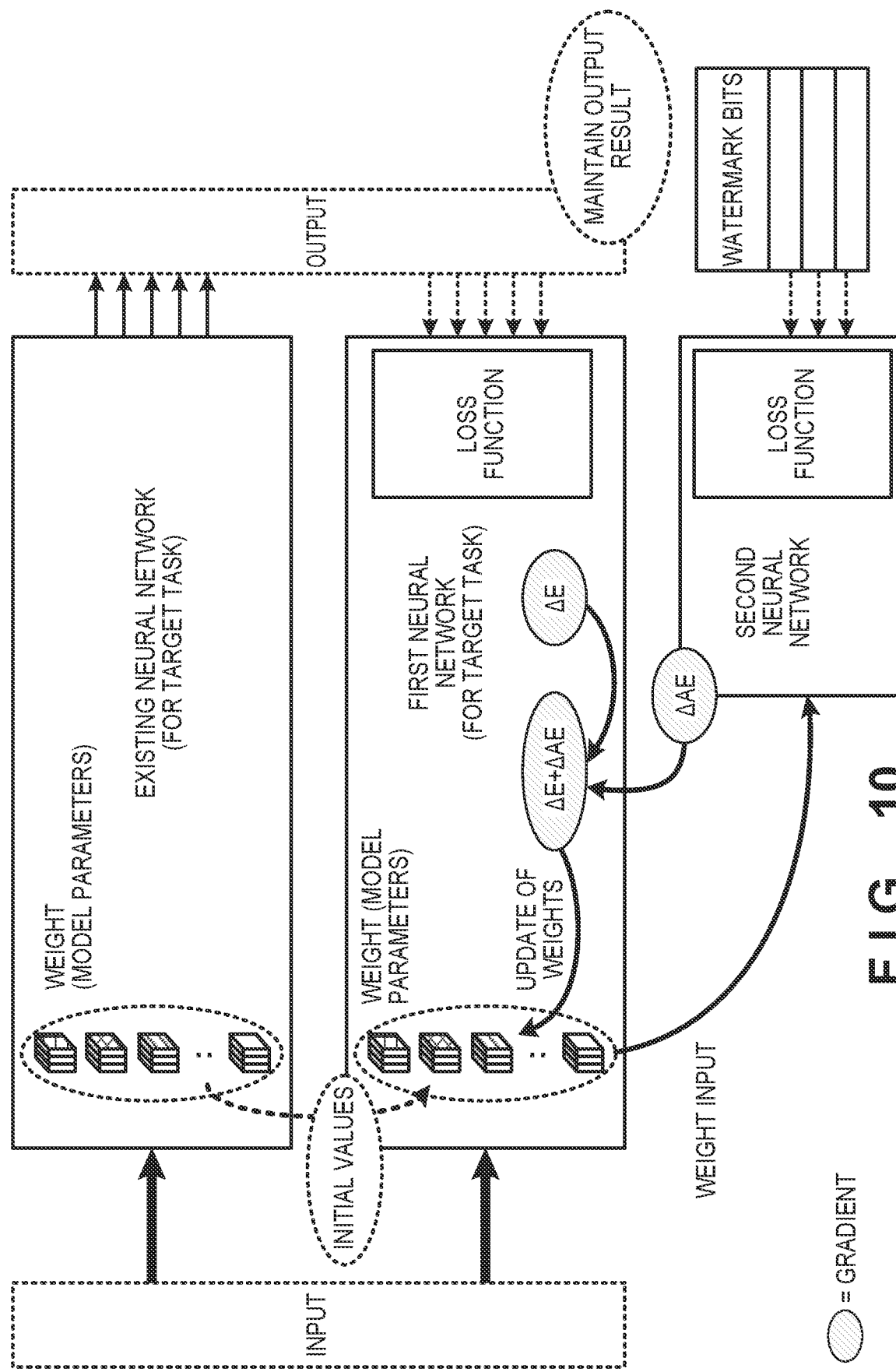
F I G. 10

INFORMATION PROCESSING APPARATUS FOR EMBEDDING WATERMARK INFORMATION, METHOD, AND COMPUTER READABLE STORAGE MEDIUM

CROSS-REFERENCE TO RELATED APPLICATIONS

This application is a continuation of International Patent Application No. PCT/JP2017/045656 filed on Dec. 20, 2017, which claims priority to and the benefit of Japanese Patent Application No. 2017-003041 filed on Jan. 12, 2017, the entire disclosures of which are incorporated herein by reference.

TECHNICAL FIELD

The present invention relates to technique for embedding watermark information in a neural network.

BACKGROUND ART

Neural networks have recently been garnering attention in fields of image recognition, speech recognition, and natural language processing. The neural network refers to a mathematical model for expressing characteristics of the brain of a living body by computer simulation. It refers to overall models in which artificial neurons (units) that form a network through connection of synapses evolves to have a problem-solving ability by changing bond strengths of synapses by training.

Patent Literatures (PTLs) 1 to 3 and Non-Patent Literatures (NPTLs) 1 to 3 disclose techniques for optimizing the structure of a neural network. Also, PTL 2 discloses a technique for efficiently setting weights in a large scale convolutional neural network. Also, PTL 3 discloses a technique for detecting an audio event using a neural network. Moreover, NPTLs 1 and 2 disclose a convolutional neural network appropriate for image recognition. Also, NPTL 3 discloses a technique for estimating the class of a word using a neural network.

Setting model parameters for a large scale neural network requires training for a long period of time with respect to a large scale data set. For example, NPTL 2 discloses that a training for two to three weeks is required using four GPUs (Graphics Processing Units). Therefore, NPTLs 4 and 5 disclose techniques for setting model parameters inside a neural network, without training the model parameters, by using a portion of model parameters that have been trained in advance, or by performing re-training using such model parameters as initial values.

CITATION LIST

Patent Literature

PTL 1: Japanese Patent Laid-Open No. 2015-11510
PTL 2: Japanese Patent Laid-Open No. 2015-52832
PTL 3: Japanese Patent Laid-Open No. 2015-57630

Non-Patent Literature

NPTL 1: A. Krizhevsky, I. Sutskever and G. E. Hinton, "ImageNet Classification with Deep Convolutional Neural Networks," NIPS'12.
NPTL 2: K. Simonyan and A. Zisserman, "Very Deep Convolutional Networks for Large-Scale Image Recognition," ICLR'15.
NPTL 3: X. Ma and E. Hovy, "End-to-end Sequence Labeling via Bi-directional LSTM-CNNs-CRF," ACL'16.
NPTL 4: S. Ren, K. He, R. Girshick, and J. Sun, "Faster R-CNN: Towards Real-Time Object Detection with Region Proposal Networks," NIPS'15.
NPTL 5: W. Liu, et al., "SSD: Single Shot MultiBox Detector," ECCV'16.
NPTL 6: P.-T. Yu, H.-H. Tsai, and J.-S. Lin, "Digital watermarking based on neural networks for color images," in Signal Processing, vol. 81, no. 3,2001.
NPTL 7: M. Elarbi, C. B. Amar, and H. Nicolas, "Video Watermarking Based on Neural Networks," in Proc. of ICME, 2006.
NPTL 8: Fei-Fei Li & Andrej Karpathy & Justin Johnson, Lecture 7, Convolutional Neural Networks, 27 Jan. 2016, [online] Internet, URL:http://cs231n.stanford.edu/slides/winter1516_lecture7.pdf, retrieved in Jan. 4, 2017.
NPTL 9: Regularization, [online], Internet, URL:https://ja.wikipedia.org/wiki/%E6%AD%A3%E5%89%87%E5%8C%96, retrieved in Jan. 5, 2017.
NPTL 10: A. Krogh and J. A. Hertz, "A Simple Weight Decay Can Improve Generalization," in Proc. of NIPS, 1992.

SUMMARY OF INVENTION

Technical Problem

As described above, if all model parameters are trained from scratch using a large scale neural network, a large amount of calculation cost and efforts are required. Therefore, there are cases where a research institute distributes trained model parameters in a license form for allowing re-use thereof in order to improve efficiency of study, as its main purpose.

However, in a commercial service, the trained model parameters themselves are a core technology in the service, and in many cases, in general, the re-use thereof is prohibited.

For example, an unauthorized use of an image or the like can be easily visually found out. However, it is not easy to visually find out an unauthorized use of model parameters. This is because, if re-training is performed, after a portion of model parameters is modified, using the modified model parameters as the initial value, neither the model structure nor the model parameters matches the original thereof.

NPTLs 6 and 7 propose techniques for using a neural network in order to embed watermark information into moving image data. In contrast, the inventors of the present application have considered embedding watermark information into model parameters of a neural network. That is, it is considered that, even if re-training is performed using model parameters in which a portion thereof is modified, if the watermark information can be detected from the model parameters, the model parameters that have been used without authorization can be detected.

Solution to Problem

The present invention provides a technique for embedding watermark information in a neural network.

According to one aspect of the present invention, the information processing method is an information processing method for embedding watermark bits into weights of a first neural network, and includes: obtaining an output of a second neural network by inputting a plurality of input values obtained from a plurality of weights of the first neural network to the second neural network; obtaining second gradients of the respective plurality of input values based on an error between the output of the second neural network and the watermark bits; and updating the weights based on values obtained by adding first gradients of the weights of the first neural network that have been obtained based on backpropagation and the respective second gradients.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

FIG. 5 is a diagram illustrating an information processing method in an information processing apparatus according to one embodiment.

FIG. 7 is a configuration diagram of a second neural network according to one embodiment.

FIG. 9 is a diagram illustrating the extraction of watermark information from a weight filter of another neural network, which is performed by the second neural network of one embodiment.

FIG. 10 is a diagram illustrating the training using an output result of an existing neural network as the training data, according to one embodiment.

DESCRIPTION OF EMBODIMENTS

Hereinafter, embodiments of the present invention will be described in detail using the drawings.

Figure 1:
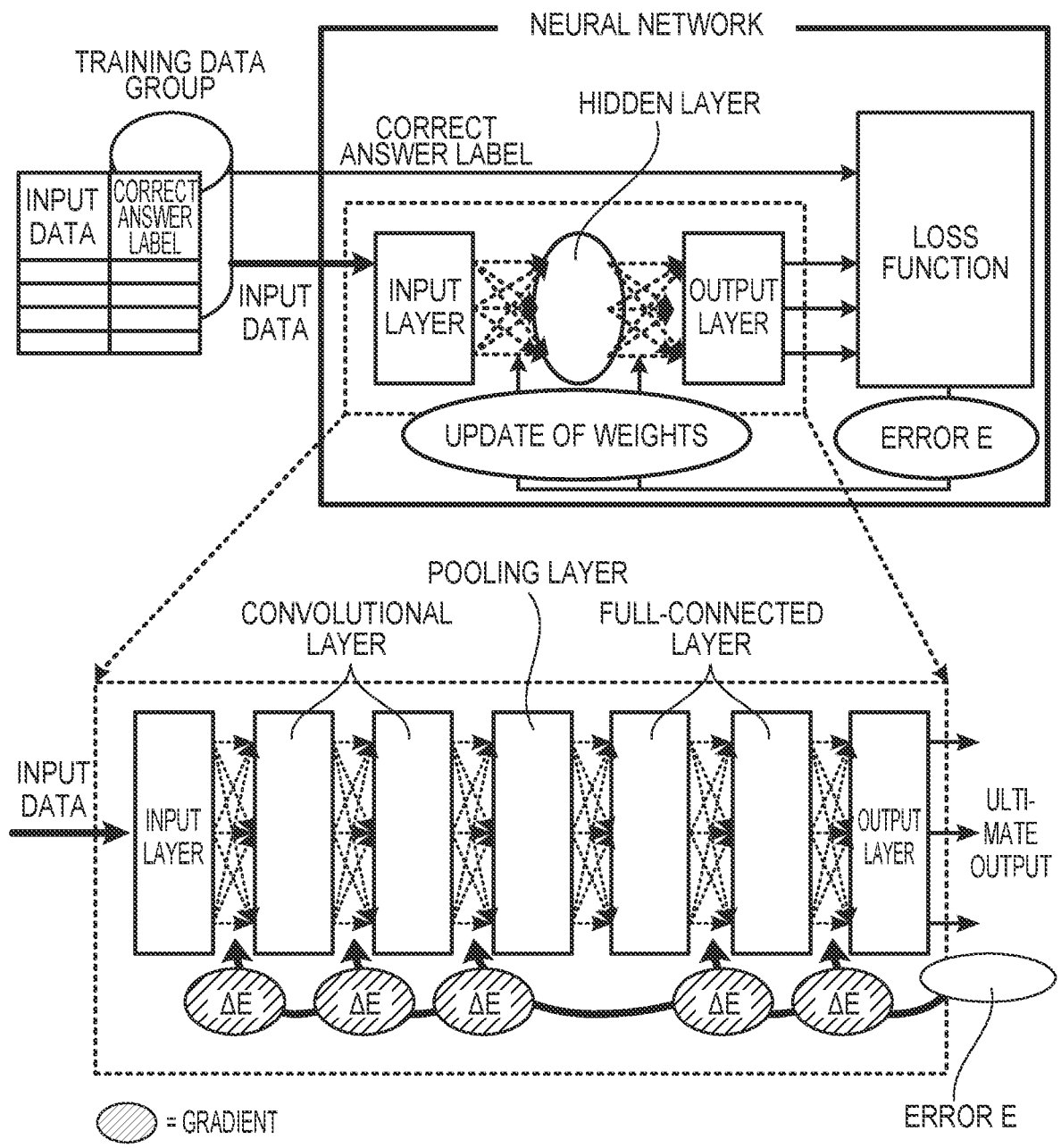
FIG. 1 is a general functional configuration diagram of a neural network.

FIG. 1 is a general functional configuration diagram of a neural network.

Various configurations are adopted as the neural network, but basically, the neural network is expressed as overlaying (or a graph structure) of a plurality of types of layers. Training data in which input data is associated with a correct answer label is input to the neural network. Also, in the neural network, model parameters are trained such that an ultimate output result corresponding to the input data matches the correct answer label (output corresponding to the input is approximated according to a task).

According to FIG. 1, a feedforward neural network is constituted by three layers, namely an input layer, a hidden layer, and an output layer, and input data propagates, in one direction, from the input layer toward the output layer. The hidden layer may be constituted by a plurality of layers. Each layer includes a plurality of units (neurons), and inputs from units in a forward layer to units in a backward layer are associated with respective parameters called "weights". The training refers to an operation to calculate appropriates "weights".

A convolutional neural network (CNN) is illustrated in FIG. 1. The convolutional neural network is constituted by an input layer, convolutional layers, a pooling layer, full-connected layers, and an output layer.

The training refers to an operation to appropriately update weights in the respective layers using an error between the output data from the output layer corresponding to input data and the correct answer label associated with the input data. A "loss function" is defined in order to calculate the error. The error sequentially propagates from the output layer side toward the input layer through "backpropagation", and the weights in the respective layers are updated little by little. Finally, a convergent calculation is executed in which the weights in the respective layers are adjusted to appropriate values such that the error is reduced.

Figure 2:
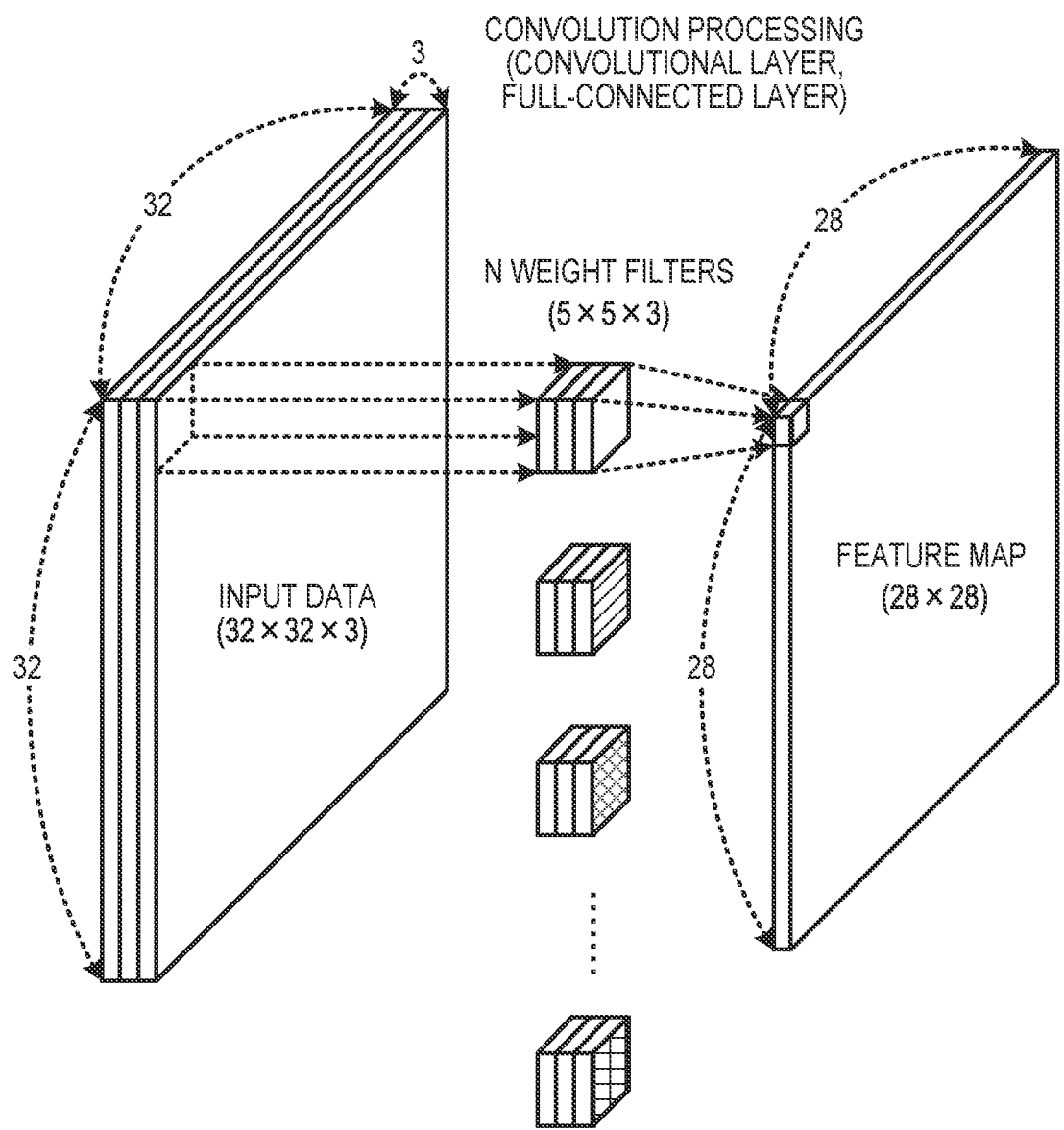
FIG. 2 is a diagram illustrating a convolutional relationship between input data and a feature map.

FIG. 2 is a diagram illustrating a convolutional relationship between input data and a feature map.

The processing in FIG. 2 is executed by the convolutional layers and the full-connected layers. According to FIG. 2, one feature map is generated by applying one weight filter on input data. Note that, in the present embodiment, the sizes of the input data, the weight filter, and the feature map are as follows.

Input data: 32×32×3 elements
Weight filter: 5×5×3 elements (weights)
Feature map: 28×28 elements Note that N weight filters are prepared, which form the model parameter. That is, in this example, the model parameter means the N weight filters. Note that, here, the bias term is not considered.

Figure 3:
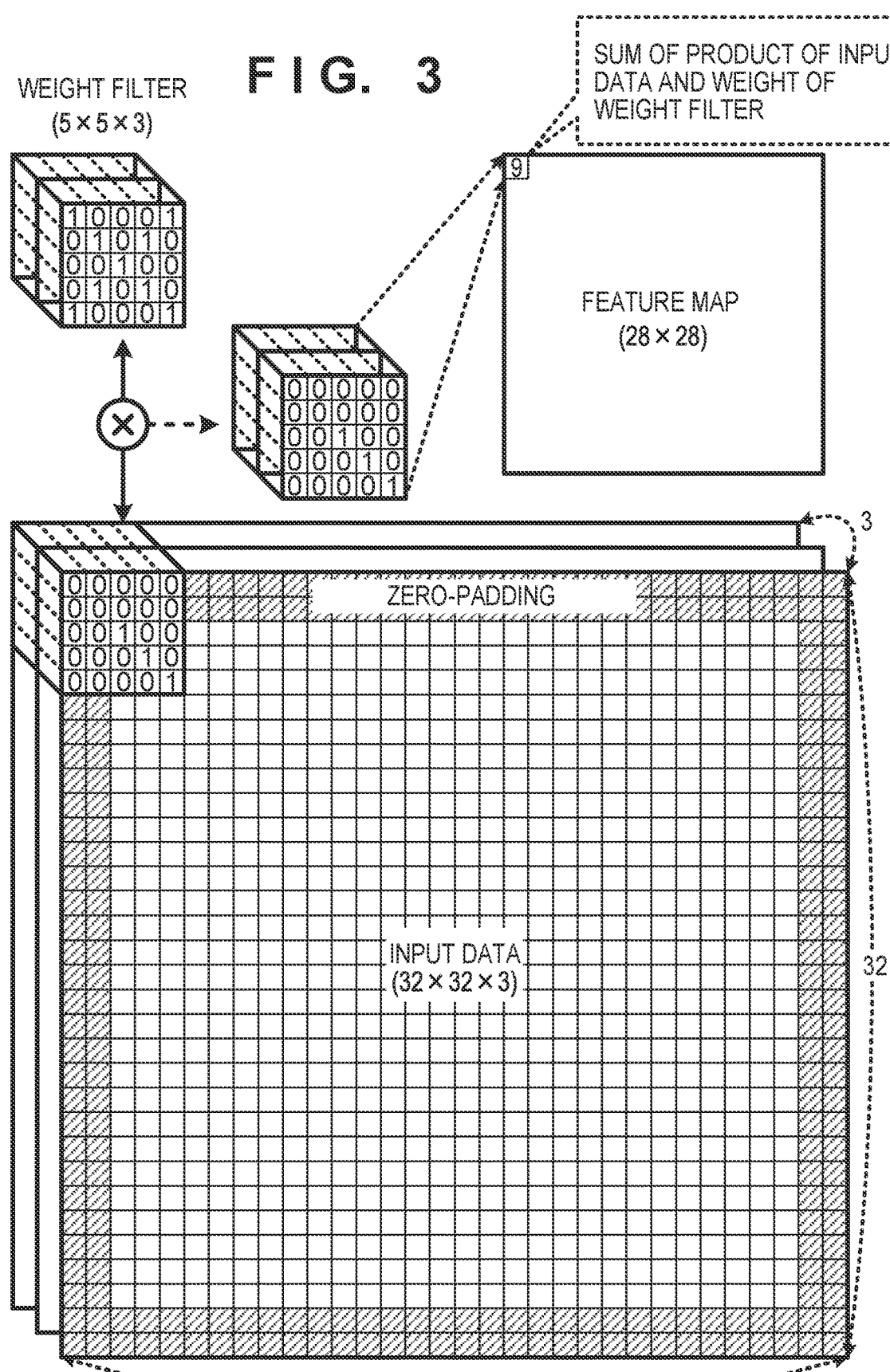
FIG. 3 is a diagram illustrating the generation of a feature map using a weight filter.

FIG. 3 is a diagram illustrating generation of a feature map using a weight filter.

According to FIG. 3, the value of one element of the feature map is obtained by applying one weight filter including 5×5×3 weights to the input data, and adding up products of values of the input data and the weight filter at the respective corresponding positions. Also, one feature map is generated by moving the same weight filter relative to the input data. Here, the number of elements (movement amount) by which the weight filter is moved is referred to as a "stride". A zero-padding region can be provided in peripheral edges of the input data that is filled with elements 0. With this, a weight filter having the same number of elements can be applied to the elements in the edges of the input data.

Figure 4:
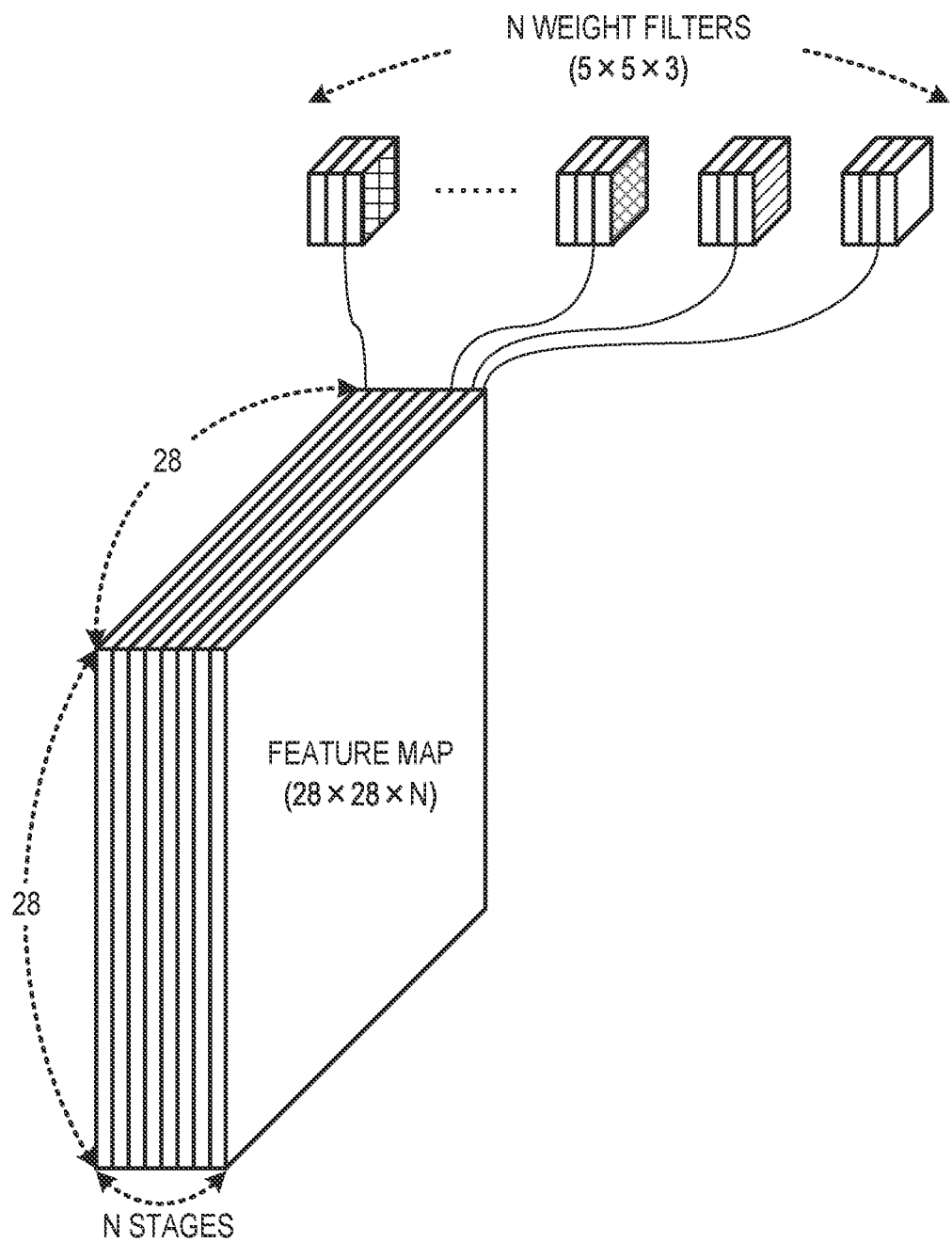
FIG. 4 is a diagram illustrating relationship between N weight filters and a feature map with N stages.

FIG. 4 is a diagram illustrating relationship between N weight filters and a feature map with N stages.

N weight filters are present. According to FIGS. 2 and 3, one feature map is generated using one weight filter. Therefore, a feature map with N stages is generated using the N weight filters, as shown in FIG. 4.

FIG. 5 is a diagram illustrating an information processing method in an information processing apparatus according to the present embodiment.

In the present embodiment, watermark bits, specifically, the number of watermark bits and the values (0 or 1) of the bits are defined in advance. In the following description, the number of watermark bits is denoted as B. As shown in FIG. 5, the information processing apparatus retains information for constituting a first neural network for a target task and a second neural network. The target task refers to a task based on the usage application of a neural network based on image recognition, speech recognition, or natural language processing, for example. The second neural network is a neural network for extracting watermark bits from values based on the weights (model parameter) of the first neural network. Note that, in the following description, the watermark bits extracted (output) by the second neural network are referred to as extracted watermark bits in order to distinguish the watermark bits extracted from the second neural network from the watermark bits that are defined in advance. A loss function for evaluating an error between the extracted watermark bits and the watermark bits is defined with respect to the second neural network as well. Note that the configuration and parameters of the second neural network will be described later, and the values of the parameters (weights) are fixed to predetermined values. That is, the second neural network is a fixed function that receives values based on the weights of the first neural network as an input and outputs extracted watermark bits having the same number of bits as the watermark bits.

In the training of a common neural network, gradients are obtained by backpropagation with respect to the respective weight, and the weights are updated based on the corresponding gradients, and this operation is repeated. In the present embodiment as well, input data is input to the first neural network, and first gradients $\Delta E$ are obtained with respect to the respective weights of the first neural network based on the correct answer labels associated with the input data. Also, here, average weights obtained from the weights of the first neural network are input to the second neural network to obtain the extracted watermark bits therefrom. Then, second gradients $\Delta AE$ are obtained by backpropagation with respect to the respective average weights that have been input based on the error between the extracted watermark bits and the watermark bits. Note that, in the common neural network, gradients are obtained with respect to weights, which are variables, instead of input data. However, in the present embodiment, the parameters (weights) of the second neural network are fixed values, as described above, and the second gradients with respect to the respective average weights that are input data, in contrast to the normal case, and are calculated from the weights of the first neural network are obtained in the present embodiment. This is equivalent to the case where the average weights obtained from the weights of the first neural network are the parameters (weights) of the second neural network, and the weights are updated using predetermined fixed values as input data to the second neural network. Also, the second gradients obtained with respect to the respective average weights, which are input data to the second neural network, are added to the first gradients obtained with respect to the respective weights of the first neural network, and the weights of the first neural network are adjusted based on the gradients obtained by addition. Hereinafter, the information processing method in the information processing apparatus will be described in detail with reference to FIG. 6.

Figure 6:
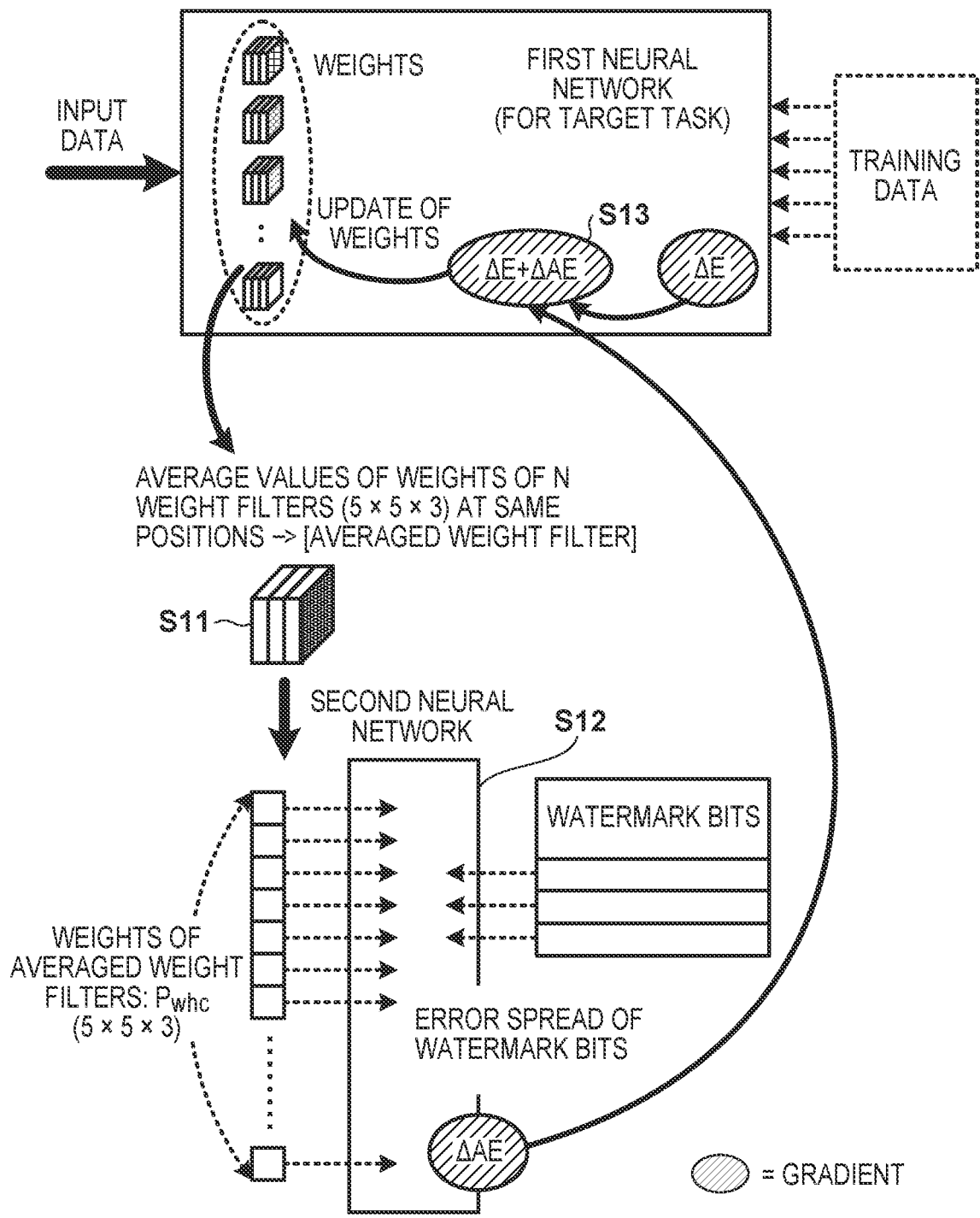
FIG. 6 is a diagram illustrating processing steps in the information processing method according to one embodiment.

FIG. 6 is a diagram illustrating processing steps in the information processing method.

S11; First, values based on the "weights" of the first neural network are input to the second neural network. In the present embodiment, an averaged weight filter is obtained from the N weight filters, and the weights of the averaged weight filter are input to the second neural network. The weights at the respective positions of the averaged weight filter are average values of the weights of the N weight filters at the respective corresponding positions. For example, if the size of one "weight filter" of the first neural network is $M=5\times5\times3$, as shown in FIG. 2, the averaged weight filter has $5\times5\times3$ weights, as shown in FIG. 6, and a total of 75 values are input to the second neural network. Specifically, if the weight at the position $w\times h\times c$ of an n-th filter (n is an integer from 1 to N) of the first neural network is denoted as $F_{nwhc}$, and the weight at the position $w\times h\times c$ of the averaged weight filter is denoted as $P_{whc}$, $$P_{whc}=\Sigma_{n=1}^{N}F_{nwhc}/N.$$

Here, the reason why the averaged weight filter is input to the second neural network is because the modification to exchange sequence of application of the N weight filters to the input data is considered. Even if the sequence of application of the N weight filters is exchanged, an essentially equivalent neural network is configured. Therefore, even if watermark information can be embedded into an individual weight filter, the watermark information can be easily destroyed by exchanging the sequence of application of the weight filters. Therefore, according to the present invention, an "averaged weight filter" obtained by averaging the weights of the N weight filters is generated and input to the second neural network.

S12: The second neural network, upon receiving the weights of the averaged weight filter, outputs extracted watermark bits, which are compared with the watermark bits. Also, in the present embodiment, the second gradients $\Delta AE$ with respect to the weights of the averaged weight filter, which are regarded as variables, are obtained by backpropagation. In the following, the second gradient obtained with respect to the weight $P_{whc}$ of the averaged weight filter is denoted as $\Delta AE_{whc}$. The first neural network, upon receiving input data, outputs output data, which is compared with training labels. Also, with respect to the first neural network, the first gradients $\Delta E$ are generated by backpropagation with respect to the respective weights, as usual. In the following, the first gradient obtained with respect to the weight $F_{nwhc}$ is denoted as $\Delta E_{nwhc}$.

S13: Then the weight $F_{nwhc}$ of the first neural network is updated based on the sum of the gradients $\Delta E_{nwhc}$ and $\Delta AE_{whc}$ or the sum of a value obtained by multiplying $\Delta AE_{whc}$ by a predetermined factor and the gradient $\Delta E_{nwhc}$. For example, since the number of filters in the first neural network is N, the predetermined factor that is to be multiplied to $\Delta AE_{whc}$ can be 1/N. In this way, each weight of the first neural network is updated based on the sum of the first gradient obtained with respect to the weight and the second gradient obtained with respect to the input to the second neural network, the input being obtained from the weight.

In this way, in the training of the first neural network, the error in the first neural network is minimized, and the error in the second neural network is minimized, at the same time. As a result of repeating the processing in FIG. 6, watermark information can be embedded into the weight filter of the first neural network.

FIG. 7 illustrates an example of the second neural network according to the present embodiment.

FIG. 7 illustrates a layer structure of the second neural network. FIG. 7 shows an example in which the second neural network is constituted by a single-layer or multi-layer perceptron. Note that, in this configuration, the weights of the second neural network are determined in advance, and are fixed to the determined values, as described above. In this way, the second neural network performs a predetermined computation on input data (weights of the averaged weight filter).

The loss function, in general, is used to perform regularization on the parameters of the convolutional layers and the full-connected layers in order to prevent overfitting (refer to NPTL 9 and 10, for example). In contrast, in the second neural network, the loss function is defined in order to embed the watermark information into the parameters of the averaged weight filter, and as a result, the essential object thereof is totally different. Of course, various embodiments can be applied to the loss function according to the method of embedding information.

The "perceptron" refers to a model in which one of binary values (0 or 1) is output from a value obtained by weighting an input value z using an activation function. The activation function simulates the function of the synapse, in the brain, that fires when the input exceeds a threshold value. The activation function may use a sigmoid function, a linear combination function, a hard sigmoid function, a tanh function (hyperbolic tangent function), a softsign function, a softplus function, a ReLU (Rectified Linear Unit), for example.

The single-layer or multi-layer perceptron based on the second neural network may be one of the following four embodiments, for example.

First Embodiment

The single-layer or multi-layer perceptron based on the second neural network uses a sigmoid function as the activation function for the ultimate output. Also, the error is calculated using a binary cross-entropy as the loss function. The value range of an input value z of the sigmoid function is a range of the entire real numbers (−∞ to +∞), and the value range of an output value y is a range from 0 to 1.

$Y=1/(1+e^{-z})$

In the binary cross-entropy, with respect to two patterns, when the probability of one pattern is p, the probability of the other pattern in 1−p. That is, the binary cross-entropy is obtained by orthogonalizing a function generated according to a specific probability distribution. That is, the loss function of the second neural network can be $-\{t_b \log O_b + (1-t_b) \log(1-O_b)\}$.

Here, $O_b$: $b^{th}$ bit of extracted watermark bits (b is a number from 1 to B), $t_b$: $b^{th}$ bit of watermark bits (b is a number from 1 to B).

That is, the loss function may be defined similarly to the case where classification into binary values is performed with respect to a usual class classification task. Moreover, in general, the watermark bits can be nonlinearly embedded by configuring a multi-layer perceptron by adding an intermediate layer to the full-connected layers.

Second Embodiment

The single-layer or multi-layer perceptron based on the second neural network may calculate the ultimate output using, as the input to the activation function, the same number of weights as the watermark bits from the weights of the average weights that are to be input.

Third Embodiment

The single-layer or multi-layer perceptron based on the second neural network may extract the same number of pairs as the number of bits of the watermark information from the weights of the average weights that are to be input and calculate the ultimate output using the differences of the respective pairs as the input to the activation function.

Fourth Embodiment

The fixed weights, of the single-layer or multi-layer perceptron based on the second neural network, that are determined in advance may be generated based on a specific probability distribution. The specific probability distribution is a uniform distribution or a normal distribution. Also, the fixed weights of the multi-layer perceptron that are determined in advance may be obtained by orthogonalizing weights that are generated according to a specific probability distribution.

Also, the second neural network may have B weight vectors $X_1$ to $X_B$ as the fixed weights that are determined in advance. Here, the vectors $X_1$ to $X_B$ each have W×H×C fixed values as the elements. Also, the second neural network, taking the W×H×C weights that are input data as a vector I, can obtain an inner product of the vector $X_b$ (b is an integer from 1 to B) and the vector I as the extracted watermark bit $O_b$. The weight vectors $X_1$ to $X_B$ can be generated from random numbers in accordance with a certain probability distribution (normal distribution in which the average is 0 and the variance is 1, for example), for example.

Also, the weight vectors $X_1$ to $X_B$ may be set so as to be a normal orthogonal base. These can be realized by generating the weight vectors X from a normal distribution in which the average is 0 and the variance is 1, and orthogonalizing the weight vectors X using Gram-Schmidt orthogonalization or the like, for example.

Figure 8A:
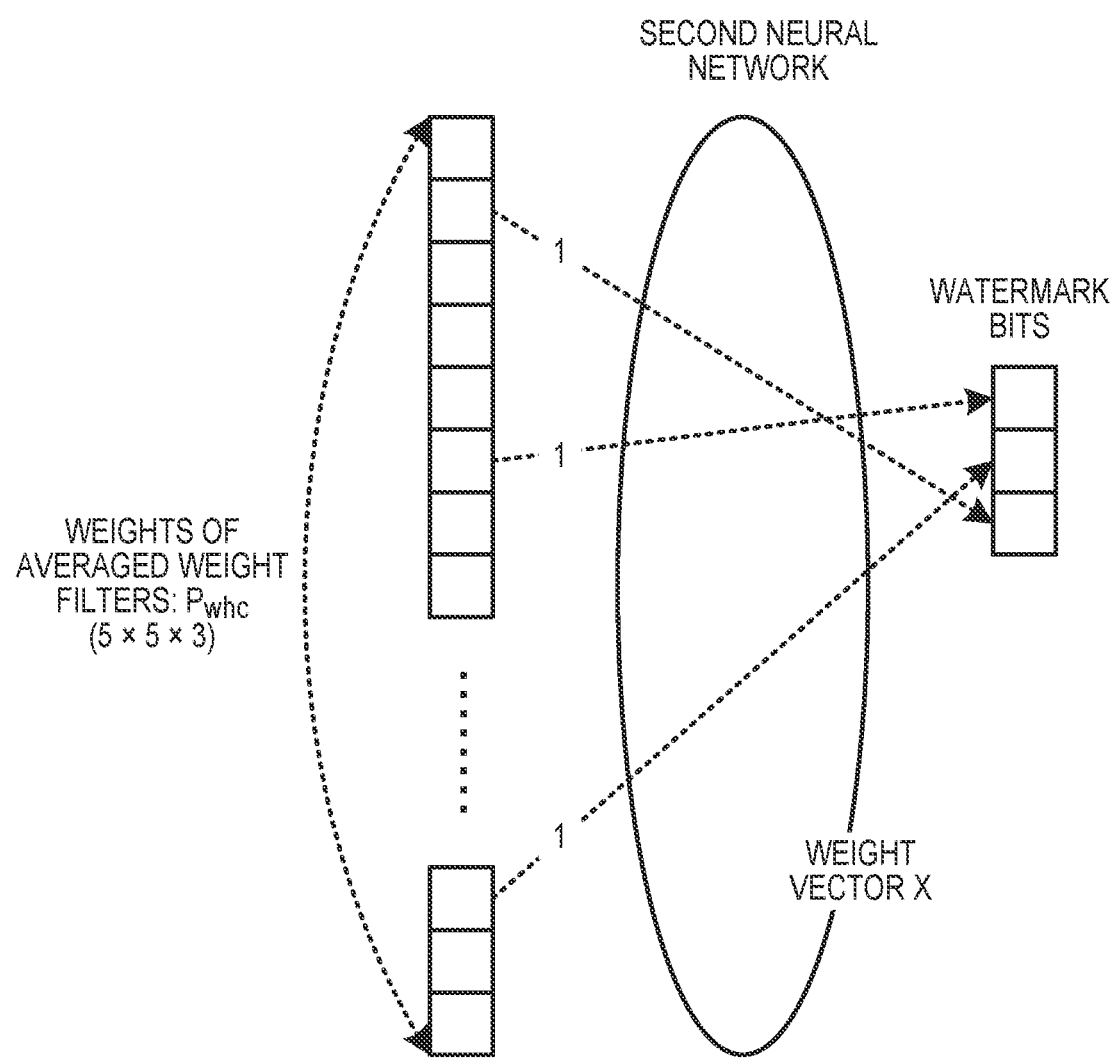
FIG. 8A is a diagram illustrating the correspondence between weights in an averaged weight filter and watermark bits according to one embodiment.
Figure 8B:
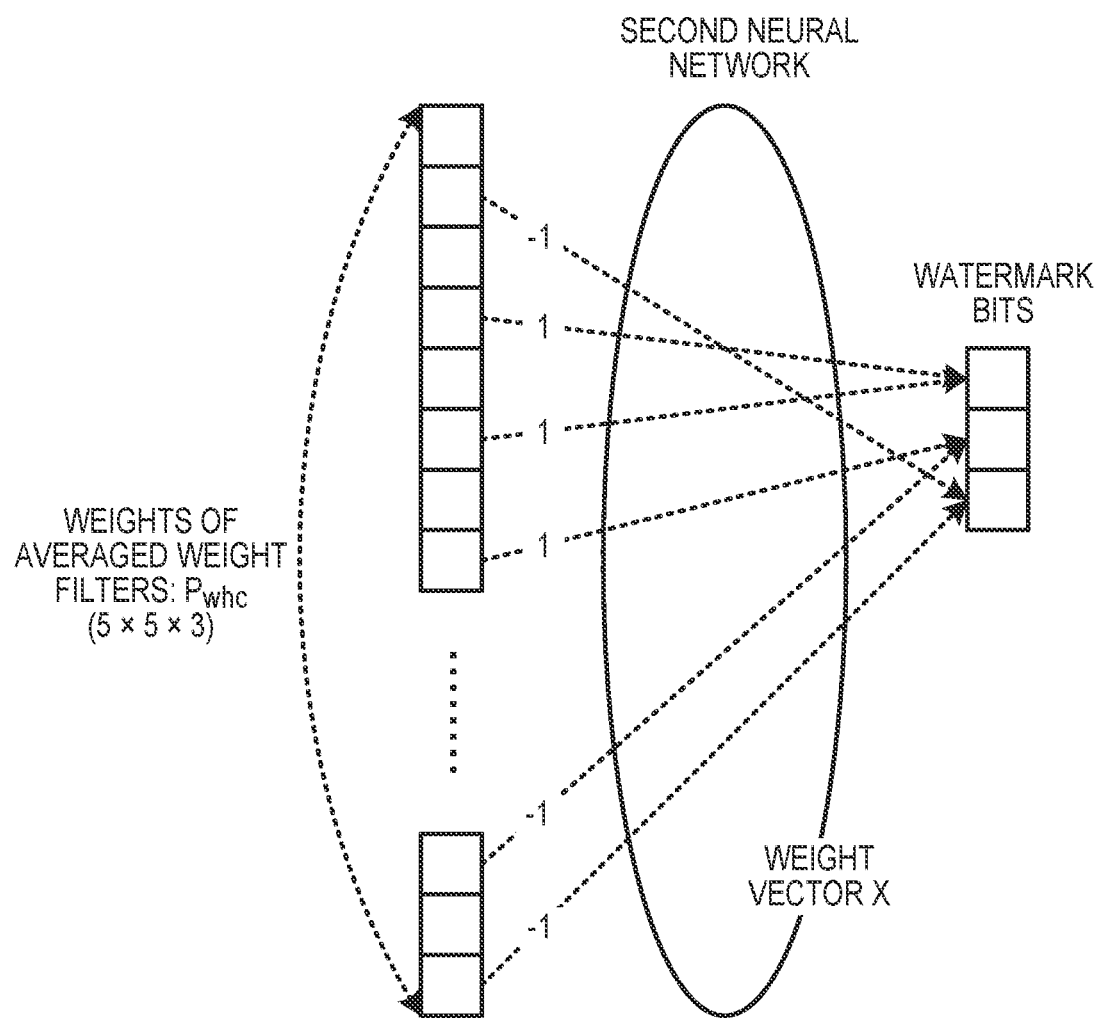
FIG. 8B is a diagram illustrating the correspondence between weights in an averaged weight filter and watermark bits according to one embodiment.

More simply, as shown in FIG. 8A, the weight vectors X may also be generated such that B weights are selected at random from the W×H×C weights of the averaged weight filter, and the selected weights are respectively associated with watermark bits in a one-to-one relationship. The selected weights are input to the activation function, and the output of the activation function is compared with the corresponding watermark bit. Moreover, as shown in FIG. 8B, the weight vectors X may also be generated such that B pairs (sets) of weights are selected at random from the W×H×C weights of the averaged weight filter, and the selected pairs are respectively associated with watermark bits in a one-to-one relationship. Also, the difference between two weights of each pair is input to the activation function, and the output of the activation function is compared with the corresponding watermark bit.

FIG. 9 is a diagram illustrating the extraction of the watermark information from the averaged weight filter. According to FIG. 9, the watermark information is extracted from the N weight filters following the steps described below. S21: First, the averaged weight filter is calculated from the N weight filters. S22: Then, the weights of the averaged weight filter are input to the second neural network. With this, the second neural network outputs the extracted watermark bits. Here, if the second neural network is a single-layer or multi-layer perceptron, the second neural network may extract the watermark bits by outputting "1" if the output of the perceptron is a predetermined threshold value (0.5, for example) or more, and outputting "0" if otherwise.

In the comparison between the extracted watermark bits and the watermark bits, corresponding bit strings are compared, and the extracted watermark bits can be determined to match the watermark bit if the Hamming distance between the bit strings is a predetermined threshold value or less.

FIG. 10 is a diagram illustrating the training using an output result of an existing neural network as the training data.

FIG. 5 illustrates a case where the watermark information is embedded when the model parameter (weights) is trained anew. In contrast, FIG. 10 illustrates a case where the watermark information is embedded by re-training using the trained model parameter as the initial value.

When the trained model parameter is used, it is naturally envisioned that a correct answer label serving as the training data cannot be used. In this case, according to the present invention, it is also possible that the watermark information is embedded to a trained weight filter without the training data.

According to FIG. 10, compared with FIG. 5, the information processing apparatus includes two neural networks for a target task, namely an existing neural network and the first neural network, in order to obtain output data serving as the training data. The first neural network executes training of the model parameter after setting the model parameter (weight filter) trained by the existing neural network as the initial value. Here, certain same data is input to both of the existing neural network and the first neural network. In contrast, the first neural network outputs data using the trained model parameter (weight filter). The first neural network performs training such that the loss function is minimized using the data output from the trained existing neural network as the "correct answer label" of the training data.

Embedding of the watermark information in the model parameter with respect to the convolutional layers has been described. Note that, with respect to the full-connected layers as well, it can be considered that there are N weight filters having the same number of parameters as the output dimension of the forward layer (excluding the bias term). These weight filters are averaged, similarly to the convolutional layers, and an averaged weight filter having the same dimension as the output dimension of the forward layer can be calculated. As a result of constructing one or more full-connected layers having B outputs, the watermark information can be embedded in a totally similar manner such as that when embedding into the convolutional layers.

Figure 11:
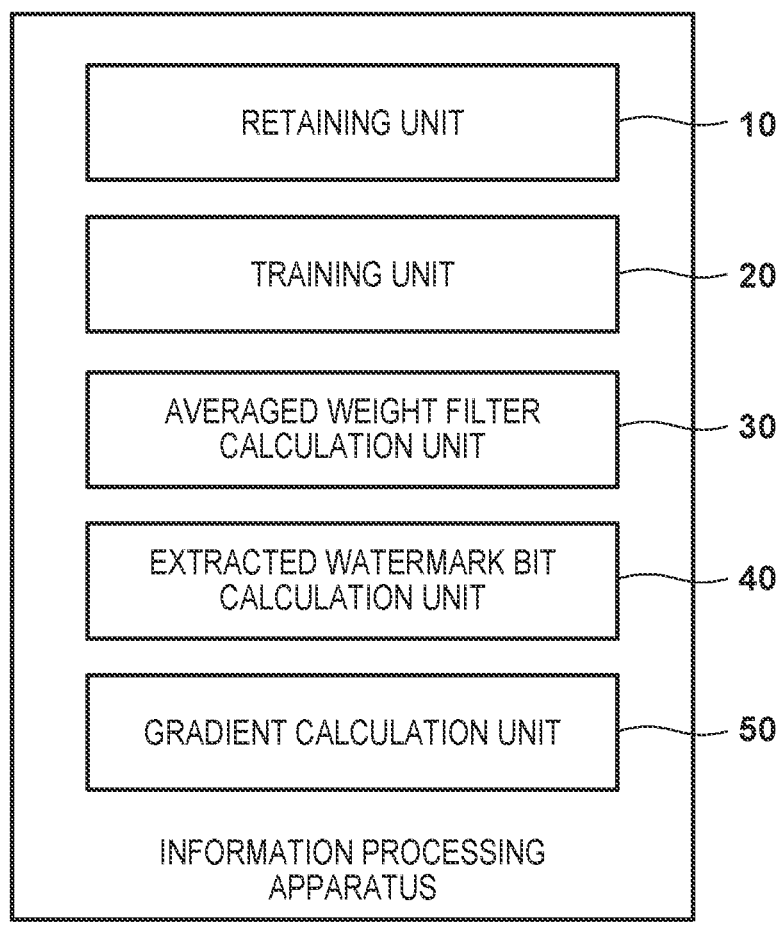
FIG. 11 is a configuration diagram of the information processing apparatus according to one embodiment.

FIG. 11 is a configuration diagram of the information processing apparatus according to the present embodiment. A retaining unit 10 retains information indicating the configuration of the first neural network and the second neural network. An averaged weight filter calculation unit 30 calculates an averaged weight filter, which is the input data to the second neural network, from weight filters of the first neural network that are retained by the retaining unit 10. An extracted watermark bit calculation unit 40 obtains extracted watermark bits based on the averaged weight filter calculated by the averaged weight filter calculation unit 30 and information indicating the configuration of the second neural network that is retained by the retaining unit 10. A gradient calculation unit 50 obtains second gradients with respect to the respective weights of the averaged weight filter based on the extracted watermark bits obtained by the extracted watermark bit calculation unit 40, the watermark bits, and the loss function of the second neural network. A training unit 20 performs training of the first neural network retained by the retaining unit 10. Specifically, similarly to the training of a common neural network, first gradients are obtained with respect to respective weights of the weight filters based on a training data group. When a certain weight is updated based on the sum of the first gradient obtained with respect to the weight and the second gradient obtained by the gradient calculation unit 50 with respect to a weight of the averaged weight filter calculated based on the weight.

As described above, according to the present invention, watermark information can be embedded into a neural network. Note that the present invention can also be realized as an information processing method that, as a result of being executed by one or more processors of a computer, causes the computer to function as the information processing apparatus, or a program for causing the computer to execute the information processing method. This program can be distributed in a form of a computer readable storage medium that stores the program, or via a network.

According to the present invention, watermark information with which modification of a model parameter used in a convolutional neural network for deep learning can be detected can be embedded to the model parameter when training is performed thereon. Specifically, even if modification (such as exchanging sequence of the weight filters) is performed by a malicious third party, the watermark information can be embedded by appropriately setting the loss function regarding parameters in training. As a result of creating the model parameter into which watermark information has been embedded, the re-use distribution that is performed without permission of the author or an unauthorized use can be detected.

The present invention is not limited to the above embodiments and various changes and modifications can be made within the spirit and scope of the present invention. Therefore, to apprise the public of the scope of the present invention, the following claims are made.

The invention claimed is:

1. An information processing method for embedding watermark bits into weights of a first neural network, the method comprising:
   obtaining an output of a second neural network by inputting a plurality of input values obtained from a plurality of weights of the first neural network to the second neural network;
   obtaining second gradients of the respective plurality of input values based on an error between the output of the second neural network and the watermark bits; and
   updating the weights based on values obtained by adding first gradients of the weights of the first neural network that have been obtained based on backpropagation and the respective second gradients,
   wherein the first neural network includes N weight filters including a plurality of weights used for convolution, and
   the plurality of input values are each an average value of weights of the N weight filters at the same position.

2. The information processing method according to claim 1,
   wherein a weight at a first position of the weight filters of the first neural network is updated based on a value obtained by adding the first gradient with respect to the weight and the second gradient with respect to a first input value, of the plurality of input values, which is an average value of weights of the N weight filters at the first position.

3. The information processing method according to claim 1,
   wherein the second neural network outputs a result obtained by performing a predetermined computation on the plurality of input values.

4. The information processing method according to claim 3,
wherein the second neural network selects a same number of input values such as that of the watermark bits from the plurality of input values and calculates an output by inputting each of the selected input values to an activation function.

5. The information processing method according to claim 3,
wherein the second neural network selects a same number of pairs of input values such as that of the watermark bits from the plurality of input values and calculates an output by inputting each of differences between input values of the respective selected pairs to an activation function.

6. An information processing apparatus for embedding watermark bits into weights of a first neural network using the first neural network and a second neural network, the information processing apparatus comprising:
one or more processors; and
one or more memory devices configured to store one or more programs,
wherein the one or more programs, when executed by the one or more processors, cause the one or more processors to perform:
obtaining a plurality of input values from a plurality of weights of the first neural network;
obtaining an output of the second neural network by inputting the plurality of input values to the second neural network;
obtaining second gradients of the respective plurality of input values based on an error between an output of the second neural network and the watermark bits;
training the first neural network; and
updating the weights based on values obtained by adding first gradients of the weights of the first neural network that have been obtained based on backpropagation and the respective second gradients,
wherein the first neural network includes N weight filters including a plurality of weights used for convolution, and
the plurality of input values are each an average value of weights of the N weight filters at the same position.

7. A non-transitory computer readable storage medium storing a program, the program, upon being executed by one or more processors in a computer, causing the computer to execute:
obtaining an output of a second neural network by inputting a plurality of input values obtained from a plurality of weights of a first neural network to the second neural network;
obtaining second gradients of the respective plurality of input values based on an error between the output of the second neural network and watermark bits; and
updating the weights based on values obtained by adding first gradients of the weights of the first neural network that have been obtained based on backpropagation and the respective second gradients,
wherein the first neural network includes N weight filters including a plurality of weights used for convolution, and
the plurality of input values are each an average value of weights of the N weight filters at the same position.

* * * * *